United States Patent
Kadowaki et al.

(10) Patent No.: US 8,404,357 B2
(45) Date of Patent: Mar. 26, 2013

(54) ENVIRONMENTALLY-FRIENDLY STEEL SHEET FOR A CAN OR A CONTAINER AS WELL AS LAMINATED AND PRE-COATED STEEL SHEET BY USING IT

(75) Inventors: Nobuo Kadowaki, Tokyo (JP); Toshio Senda, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 31 days.

(21) Appl. No.: 12/733,272

(22) PCT Filed: Aug. 21, 2008

(86) PCT No.: PCT/JP2008/065344
§ 371 (c)(1),
(2), (4) Date: Mar. 31, 2010

(87) PCT Pub. No.: WO2009/025390
PCT Pub. Date: Feb. 26, 2009

(65) Prior Publication Data
US 2010/0203355 A1   Aug. 12, 2010

(30) Foreign Application Priority Data
Aug. 23, 2007 (JP) .................. 2007-216566

(51) Int. Cl.
*B32B 15/04* (2006.01)
*B32B 15/18* (2006.01)
*B32B 18/00* (2006.01)

(52) U.S. Cl. ......... 428/648; 428/660; 428/633; 428/684

(58) Field of Classification Search .................. 428/646, 428/648, 660, 661, 632, 633, 682, 684, 685, 428/219, 340, 689, 702
See application file for complete search history.

(56) References Cited

FOREIGN PATENT DOCUMENTS

| | | |
|---|---|---|
| JP | 54-158341 | 12/1979 |
| JP | 07-048677 | 2/1995 |
| JP | 11-264075 | 9/1999 |
| JP | 2000-80498 | 3/2000 |
| JP | 2002-60958 | 2/2002 |
| JP | 2003-82497 | 3/2003 |
| JP | 2007-131882 | * 5/2007 |

OTHER PUBLICATIONS

Machine Translation, Hamahara et al., JP 2007-131882, May 2007.*
International Search Report dated Sep. 30, 2008 issued in corresponding PCT Application No. PCT/JP2008/065344.

* cited by examiner

*Primary Examiner* — Michael La Villa
(74) *Attorney, Agent, or Firm* — Kenyon & Kenyon LLP

(57) ABSTRACT

Laminated steel sheet for a container material with a small environmental load container material and coating pre-coated steel sheet for a container material characterized by comprising steel sheet having on it a tin layer or iron-tin alloy layer which has on it a tin oxide layer of a thickness measured by an electric stripping method of 0 mC/cm$^2$ to 3.5 mC/cm$^2$ and has further formed on that a foundation layer including a zirconium compound not including fluorine or nitrate nitrogen, having an amount of coating converted to zirconium of 1 mg/m$^2$ to 30 mg/m$^2$, and having an amount of sulfuric acid radicals ($SO_4^{2-}$) of 0 mg/m$^2$ to 7 mg/m$^2$.

7 Claims, 4 Drawing Sheets

(a)

(b)

(c)

(d)

(e)

US 8,404,357 B2

ENVIRONMENTALLY-FRIENDLY STEEL SHEET FOR A CAN OR A CONTAINER AS WELL AS LAMINATED AND PRE-COATED STEEL SHEET BY USING IT

This application is a national stage application of International Application No. PCT/JP2008/065344, filed 21 Aug. 2008, which claims priority to Japanese Application No. 2007-216566, filed 23 Aug. 2007, which is incorporated by reference in its entirety.

TECHNICAL FIELD

The present invention relates to a surface-treated metal material and a surface treatment method for the same, more particularly relates to environmentally-friendly steel sheet for a can and a container primed without using a treatment solution containing chrome, fluorine, or nitrate nitrogen and a method for producing the same and laminated and pre-coated steel sheet by using the environmentally-friendly steel sheets superior in adhesion with the laminate film, coating materials or other organic resin films and superior in resistance to iron elution after dent impact.

BACKGROUND ART

As treatment for improving the adhesion between an organic film and a metal material like steel sheet, zinc-based plated steel sheet, zinc-alloy sheet, tin-plated steel sheet, aluminum alloy sheet, chromate treatment, phosphate treatment, silane coupling treatment, etc. have been known previously.

Among these, chromate treatment has been broadly utilized in the fields of home electrical appliances, building materials, vehicles, metal containers, etc. due to its superior corrosion resistance and adhesion, but the possibility of the toxic substance of hexavalent chrome contaminating the soil by leaching into it at the time of disposal has been pointed out, so the industry in Europe etc is already moving in the direction of eliminating chromate treatment.

In metal materials for container use, chromate treatment of a type treating tin-plated steel sheet by cathodic electrolysis in an aqueous solution of sodium bichromate or in an aqueous solution of anhydrous chromic acid not containing any fluoride so as not to leave hexavalent chrome in the film is being utilized.

However, in chromate treatment of a type where the treated layer does not include hexavalent chrome, the treatment solution itself contains hexavalent chrome, so the hexavalent chrome has to be rendered harmless for treatment of the wastewater and gas emissions. For this reason, from the viewpoint of the environment load, surface treatment where the treatment solution does not include hexavalent chrome either is desirable.

Further, fluorine, boron, nitrate nitrogen, etc. are also not preferable from the viewpoint of the load on the environment. In the future, the industry will be moving in the direction of toughening the emission standards. Therefore, the treatment solutions for metal materials for container use preferably also do not contain the above substances.

Therefore, as one measure for reducing the load on the environment, there is elimination of the use of chrome. As chrome-free surface treatment for a container material, there is an example of providing on a tin-plated surface of a tin-plated steel sheet an organic-inorganic composite coating comprising an organic compound having carbon as its main ingredient and an inorganic phosphorus compound. This is described as an example of a method of surface treatment of a tin-plated steel can superior in corrosion resistance and coating adhesion in Japanese Patent Publication (A) No. 11-264075.

As a surface treatment solution for an aluminum can or tin-plated drawn and ironed can before coating and printing, a drawn and ironed can surface treatment solution containing phosphoric acid ions and a zirconium compound and titanium compound in at least one type and containing and containing an oxidizing agent and fluoric acid and a fluoride in at least one type is disclosed in Japanese Patent Publication (A) No. 7-48677.

DISCLOSURE OF THE INVENTION

In the past, metal containers for beverage can and food can applications have generally been treated to bake on the coatings at the inside and outside surfaces of the cans after the cans are made. In recent years, as metal materials for beverage cans or food cans, steel sheet with a film hot laminated on the steel sheet in advance and pre-coated steel sheet comprised of steel sheet printed, baked, and coated in advance have been increasingly used.

However, in canmaking by drawing-ironing or draw-redrawing, an ironing force acts on the can wall, so if making a laminated steel sheet or coating pre-coated steel sheet type of metal material for container use to make a can, if the adhesive strength between the resin coating and the steel sheet is not sufficient, there is the problem that the resin coating will easily peel off.

Further, in the sterilization performed after filling the content (retort treatment), sometimes water permeates the resin coating under the high temperature and high pressure and the adhesion easily falls more, so in the worst case, blistering of the resin coating and rust occur.

The problem which the present invention attempts to solve is the provision of steel sheet for a container material of a chrome-free type as superior as steel sheet for a container material given conventional chromate treatment in adhesion with a laminate film or coating or other organic resin coating and resistance to iron dissolution after denting.

Further, in the same way as chrome compounds, treatment solutions containing a fluoride and nitrate nitrogen require wastewater treatment facilities similar to those of chrome compounds at the time of wastewater treatment so massive costs and time must be expended and treatment performed to render them harmless. From the viewpoint of the environment as well, not including a fluoride or nitrate nitrogen compound in the treatment solution is desirable, so together with the above adhesion and resistance to iron dissolution, provision of steel sheet for a container material of a chrome-free type not containing any fluoride or nitrate nitrogen with a smaller capital investment load, operating cost load, and environmental load is another problem to be solved by the present invention in the production process.

The inventors intensively studied advance surface treatment methods for chrome-free priming in the case of use of tin-plated steel sheet and methods for chromate-free priming optimal for tin-plated steel sheet in order to solve the above problem and as a result discovered that steel sheet for a container material of a chrome-free type not including any fluoride or nitrate nitrogen with a smaller capital investment load, operating cost load, and environment load can be obtained.

That is, the present invention provides:

(1) An environmentally-friendly steel sheet for a can and a container characterized by having on it a tin layer or iron-tin alloy layer which has on it a tin oxide layer of a thickness measured by an electric stripping method of 0 mC/cm² to 3.5 mC/cm² and has further formed on that a chrome-free foundation layer including a zirconium compound of a film amount converted to zirconium of 1 mg/m² to 30 mg/m² and of an amount of Sulfate radical ($SO_4^{2-}$) of 0 mg/m² to 7 mg/m².

(2) The environmentally-friendly steel sheet for a can and a container as set forth in (1) characterized in that said chrome-free foundation layer including a zirconium compound does not contain fluorine or nitrate nitrogen.

(3) Environmentally-friendly laminated steel sheet and pre-coated steel sheet for a can and a container by using the environmentally-friendly steel sheet as set forth in (1).

(4) A method for producing of the environmentally-friendly steel sheet for a can and container as set forth in (1), said method characterized by forming on a steel sheet a tin layer or iron-tin alloy layer, and then treating it by cathodic electrolysis in solution containing sodium hydrogen carbonate so as to obtain a tin oxide layer of a thickness measured by an electric stripping method of 0 mC/cm² to 3.5 mC/cm², and then treating it by cathodic electrolysis in an aqueous solution containing zirconium sulfate so as to apply a chrome-free foundation layer including a zirconium compound.

(5) A method for producing of the environmentally-friendly steel sheet for a can and a container as set forth in (1), said method characterized by forming on a steel sheet a tin layer or iron-tin alloy layer, and then dipping it in a solution containing sulfuric acid so as to obtain a tin oxide layer of a thickness measured by an electric stripping method to 0 mC/cm² to 3.5 mC/cm², and then treating it by cathodic electrolysis in an aqueous solution containing zirconium sulfate so as to apply a chrome-free foundation layer including a zirconium compound.

(6) A method for producing of the environmentally-friendly steel sheet for a can and container as set forth in (4) or (5), characterized in that the treatment to obtain said chrome-free foundation layer including a zirconium compound is not including fluorine or nitrate nitrogen.

BEST MODE FOR CARRYING OUT THE INVENTION

Figure 1:
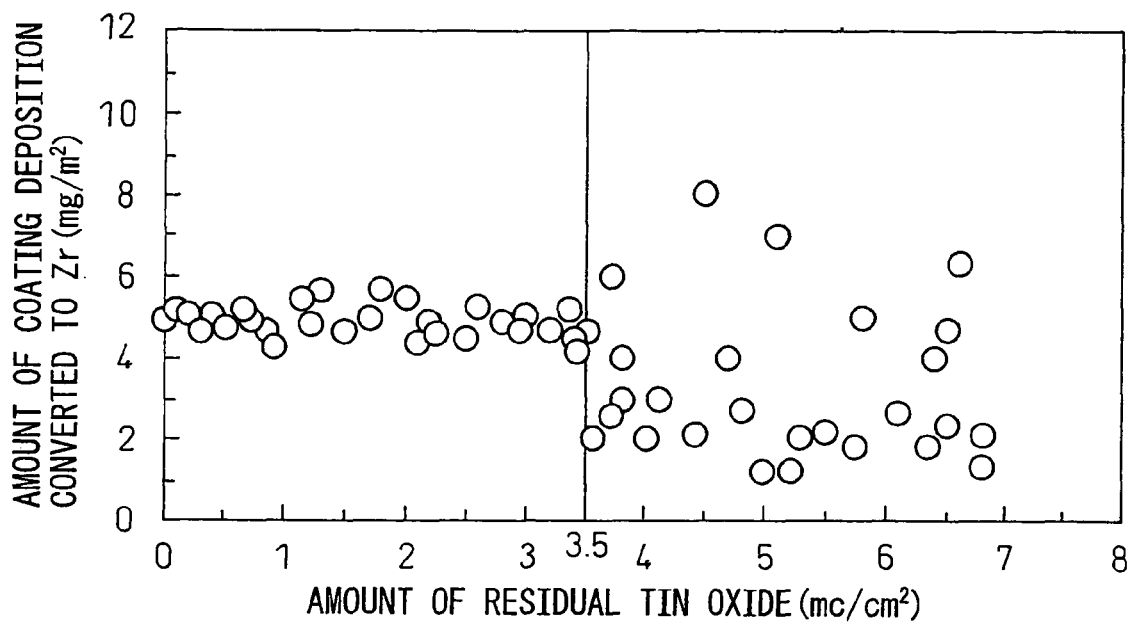
FIG. 1 is a graph showing the amount of residual tin oxide at the surface of the tin plating and the amount of coating deposition converted to zirconium.

The steel sheet for a container material of a small environmental load of the present invention has a tin-plating layer or iron-tin alloy layer at least at the surface of the steel sheet at the side becoming the inner side of the can.

Furthermore, the sheet is characterized by having formed over that a foundation layer including a zirconium compound not including any fluoride or nitrate nitrogen.

In particular, the sheet is characterized by being treated by cathodic electrolysis in a sodium hydrogen carbonate solution before obtaining chrome-free foundation layer or by being treated by dipping in sulfuric acid so as to reduce the tin oxide layer on the tin layer or iron-tin alloy layer measured by an electric stripping method to 0 mC/cm² to 3.5 mC/cm² and by making the amount of sulfuric acid radicals ($SO_4^{2-}$) in the chrome-free foundation layer 0 mg/m² to 7 mg/m².

Below, the best mode for working the invention will be explained.

<Steel Sheet>

The type of the steel sheet used for the present invention is not particularly limited, but may be one the same as the steel sheet used for materials for containers in the past.

<Tin Plating>

The type of plating able to be used for food applications has to satisfy requirements of food safety and sanitation, production ability, etc. As the type of plating able to be utilized in practice, tin, aluminum, nickel, etc. may be mentioned as suitable candidates.

As the reasons for use of tin plating in the chrome-free steel sheet for a container material used as steel sheet for a container material with a small environmental load in the present invention, good record of use in canning applications, freedom from problems in food safety and sanitation, superiority in corrosion resistance, superiority in formability, comparative low cost compared with other plating, etc. may be mentioned.

The tin-plated steel sheet used in the present invention may be the usual electroplated tin-plated steel sheet and may be treated by iron-tin alloying (reflow treatment).

The amount of tin plating is preferably in the range of 0.5 to 12.0 g/m² from the viewpoint of suppression of iron dissolution from dented parts of the film laminate or coating. If the amount of tin plating is less than 0.5 g/m², the amount of iron dissolution after denting becomes greater and the corrosion resistance falls, so this is not preferred.

Further, even if the amount of tin plating exceeds 12.0 g/m², the functions are not particularly obstructed, but in the production process, the tin easily sticks to and builds up on the rolls etc. and causes dents or the plating costs swells more than necessary.

<Treatment for Removal of Tin Oxide>

The steel sheet for the small environmental load container material of the present invention is characterized by forming a chrome-free foundation layer including a zirconium compound on a tin-plating layer or iron-tin alloy layer. Formation of this foundation layer including a zirconium compound is, for example, obtained by treatment by cathodic electrolysis in a zirconium sulfate aqueous solution not containing fluorine or nitrate nitrogen.

However, even when using a zirconium sulfate aqueous solution, as explained later, the amount of deposition of the zirconium compound became unstable, so the coating adhesion dropped in some cases. Therefore, the inventors took note of the tin oxide layer on the surface of plated sheets and investigated the relationship between the amount of tin oxide and zirconium compound.

FIG. 1 is a view showing the relationship between the amount of tin oxide and the amount of coating deposition converted to zirconium in the case of treating tin-plated steel sheet (tin deposition amount on one surface: 2.8 g/m²), dipped in sulfuric acid (dipped in 2% sulfuric acid (25° C.) for 0 to 60 seconds) to remove the tin oxide, by zirconium sulfate electrolysis (electrolytic conditions: 1 A/dm$^2$×5 seconds (40° C.)) to form a chrome-free foundation layer containing zirconium (zirconium compound coating).

As will be understood from FIG. 1, the amount of deposition of the zirconium compound coating stabilizes with an amount of tin oxide on the tin plating measured by the electric stripping method of 0 (mC/cm$^2$) to 3.5 (mC/cm$^2$).

However, if the amount of tin oxide exceeds 3.5 (mC/cm$^2$), it is learned that the amount of deposition of the zirconium compound coating becomes smaller overall and simultaneously the fluctuation in the amount of deposition becomes greater.

This is believed to be because if the tin oxide layer is thickly present, the wettability by the zirconium coating falls and the zirconium coating can no longer be uniformly deposited.

If the state of deposition of the zirconium compound on the tin-plating layer or iron-tin alloy layer is uneven, the adhesion with the laminate film or coating becomes uneven, the film or coating peels off at the time of making the steel sheet after film lamination or coating into a can, the film easily peels off when the can body is dented, and other defects readily occur.

Figure 2:
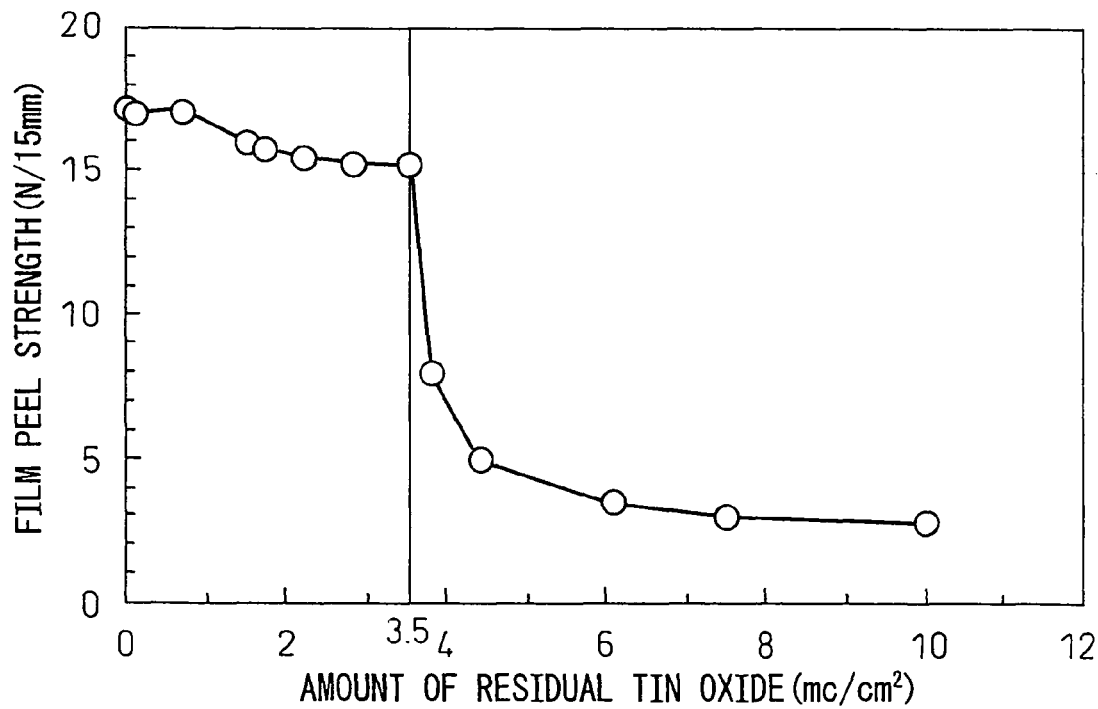
FIG. 2 is a graph showing the effect of the amount of residual tin oxide on the film peel strength.

Therefore, the inventors investigated the effects of the amount of residual tin oxide of tin-plated steel sheet on the film peel strength of film laminated tin-plated steel sheet primed by a zirconium compound. The results are shown in FIG. 2.

The laminated steel sheet used at this time was chromate-free primed steel sheet obtained by treating steel sheet with 2.8 g/m$^2$ of tin plating on one side by dipping in ammonium zirconium carbonate and hot laminated on its two sides with 20 μm thick undrawn copolymerized polyester film.

The peel strength of the film was measured by placing the film laminated steel sheet in a steam cooker for retort treatment and retort sterilizing it at 125° C. for 90 minutes.

The amount of tin oxide of the tin-plated steel sheet is the amount of tin oxide measured by the electric stripping method before priming of a tin-plated steel sheet obtained by treating untreated tin-plated steel sheet to suitably remove tin oxide.

As will be understood from FIG. 2, if the amount of tin oxide on the tin plating is 0 (mC/cm$^2$) to 3.5 (mC/cm$^2$), the peel strength tends to fall somewhat along with an increase of the amount of tin oxide, but is substantially stable.

However, it is learned that if the amount of tin oxide is over 3.5 (mC/cm$^2$), the peel strength of the film rapidly falls.

If the amount of tin oxide on the tin plating is 0 (mC/cm$^2$) to 3.5 (mC/cm$^2$), there may be partial places where the amount of tin oxide is small, so the film may be strongly bonding through the zirconium compound at the parts with little tin oxide.

On the other hand, it may be that starting from when the amount of tin oxide on the tin plating exceeds 3.5 (mC/cm$^2$), the tin oxide layer covers the entire surface of the tin plating, so the film easily peels from the fragile tin oxide layer.

From the above results, it is preferable that a tin-plating layer or iron-tin alloy layer have a foundation layer including a zirconium compound directly over them.

Therefore, to stabilize the state of deposition of the zirconium compound, it is preferable to completely remove the tin oxide layer of the tin-plated steel sheet (including not only the state of a layer covering the entire surface, but also scattered in islands) right before treatment for deposition of zirconium.

However, if there is tin oxide between the tin-plating layer or iron-tin alloy layer and said chrome-free priming layer, even if the tin oxide remains, if performing treatment by remove it to a level measured by the electric stripping method of 3.5 mC/cm$^2$ or less, the film peel strength can be maintained at a high strength as it is.

If the thickness of the tin oxide layer as measured by the electric stripping method exceeds 3.5 mC/cm$^2$, cohesive fracture easily occurs from the remaining tin oxide layer when work or impact is applied and the adhesion of the film or coating remarkably falls, so this is not preferred.

As the method for removal of the tin oxide layer formed on the tin-plating layer or iron-tin alloy layer, treatment by cathodic electrolysis in a sodium hydrogen carbonate solution is the most desirable method since the tin oxide layer is reliably removed in a short time and almost no tin dissolves out.

As explained above, from the viewpoint of improvement of the adhesion of the film or coating, there is preferably no tin oxide layer present at all, but even if completely removing the tin oxide layer, the tin will oxidize at the surface most part if there is even a little oxygen present. Therefore, film lamination or coating the tin plated surface in the state with no tin oxide at all is difficult by ordinary facilities. Even if this could be realized, the manufacturing costs would swell, so this cannot be said to be a preferable method.

If the tin oxide layer on the tin plating is removed to 0.01 mC/cm$^2$, an equivalent adhesion is obtained as the state with substantially no tin oxide layer, so the thickness of the tin oxide layer is preferably in the range from 0.01 mC/cm$^2$ to 3.5 mC/cm$^2$. If not considering the manufacturing costs, the most preferable lower limit of the thickness of the tin oxide layer is 0 (mC/cm$^2$). The more preferable upper limit of the thickness of the tin oxide layer is 3.3 (mC/cm$^2$), while the still more preferable upper limit is 3.0 (mC/cm$^2$).

As another method for removing the tin oxide layer formed on the tin-plating layer or iron-tin alloy layer, the method of dipping in a sulfuric acid aqueous solution is preferable. With the method of dipping in sulfuric acid, without sufficient rinsing after the treatment for removal of the tin oxide, the sulfuric acid ingredient would remain and the coating adhesion would deteriorate in some cases, so caution is required.

Note that the electric stripping method is the method applying the principle of constant current chrometry for constant current electrolysis of a test piece, recording the change in potential of the test piece accompanying electric stripping by a pen recorder, and measuring the amount of electricity, that is, the amount of deposition of surface tin and the oxide film from the electrolysis time-potential curve.

<Treatment by Zirconium Compound>

The present invention is characterized by treating a tin-plated steel sheet to remove the tin oxide layer on its tin layer or iron-tin alloy layer by cathodic electrolysis in a sodium hydrogen carbonate solution or by dipping in a sulfuric acid solution to a level measured by an electric stripping method of 3.5 mC/cm$^2$ or less, then treating this by cathodic electrolysis in a zirconium sulfate aqueous solution not containing any fluorine or nitrate nitrogen so as to form a foundation layer including a zirconium compound.

In the present invention, the "zirconium compound" specifically means zirconium oxide, zirconium hydroxide, or another compound or of composite of the same.

The reason for using a zirconium compound as a bonding primer is to cover the surface of tin-plated steel sheet by a hydrated oxide of zirconium to cause the formation of hydrogen bonds between the hydrated oxide of zirconium and the hydroxyl groups contained in the resin covering layer in the same way as chromate treatment with the aim of improving the adhesion with the resin coating.

The inventors studied the suitability of various metal-based oxides as chrome-free bonding primers in anticipation of effects similar to those of zirconium compounds, but discovered that chrome-free foundation layer by zirconium compounds is most superior in adhesion with resin coatings (in particular secondary adhesion after retort treatment).

As metal salts not containing any fluorine or nitrate nitrogen used in the method of deposition of a zirconium compound by treatment by cathodic electrolysis, carbonates, sulfates, halogenates, etc. may be considered, but zirconium sulfate is stable in aqueous solution and further can be easily obtained industrially, so is most preferred.

As the method for forming a zirconium compound as a chrome-free foundation layer without including fluorine or nitrate nitrogen, the usual method of treatment by cathodic electrolysis in a zirconium fluoride compound aqueous solution is generally used. However, fluoride baths have a high load of treatment of wastewater, so in the present invention, it is proposed to use zirconium sulfate instead of a zirconium fluoride compound for treatment by cathodic electrolysis.

However, it is generally known that in the case of forming a coating by treatment by cathodic electrolysis by a sulfuric acid compound, even if rinsing after electrolysis, sulfuric acid radicals ($SO_4^{2-}$) will remain in the coating and the remaining sulfuric acid radicals will cause the coating adhesion to drop.

The present invention discovered that, regarding the problem of the deterioration of coating adhesion due to the treatment by cathodic electrolysis in a sulfuric acid compound, by removing the tin oxide layer on the tin layer or iron-tin alloy layer on tin-plated steel sheet by the method of treatment by cathodic electrolysis in a sodium hydrogen carbonate solution or dipping in a sulfuric acid solution to a level measured by an electric stripping method of 3.5 mC/cm$^2$ or less and further by treating the sheet by cathodic electrolysis in a zirconium sulfate aqueous solution to form a zirconium compound coating, it is possible to form a foundation layer superior in coating adhesion even by a coating formed by cathodic electrolysis by a sulfuric acid compound.

Figure 3:
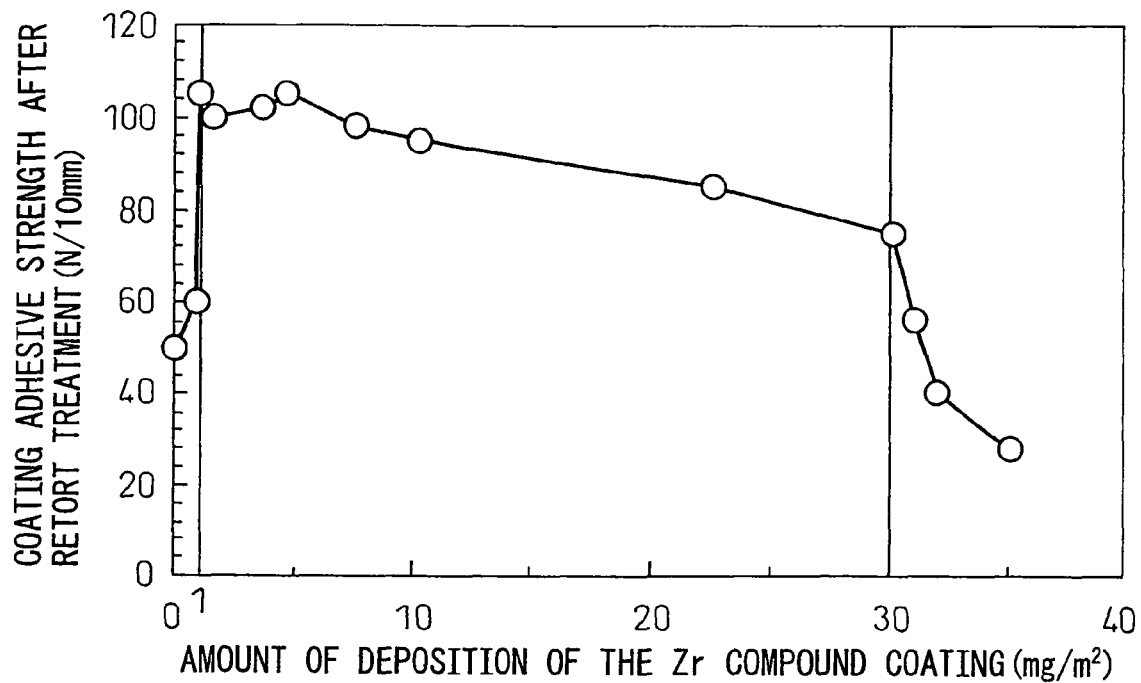
FIG. 3 is a graph showing the relationship between the amount of deposition of the zirconium compound coating and coating adhesive strength after retort treatment (wet T-peel strength).

Here, the amount of deposition of the zirconium compound coating converted to zirconium will be changed (electrolysis conditions: 1 A/dm$^2$ (40° C.)×0 to 90 seconds, rinsing conditions: 25° C.×10 seconds) to explain its suitable range using the coating adhesive strength after retort treatment, that is, the wet T-peel strength, as an indicator, with reference to FIG. 3.

As will be understood from FIG. 3, if the amount of deposition of the zirconium compound coating is in the range of 1 to 30 mg/m$^2$, the coating adhesive strength can be said to be stable.

If over 30 mg/m$^2$, the coating becomes fragile and the coating adhesive strength falls, so this is not preferred. Further, if the amount of deposition of the zirconium compound coating is less than 1 mg/m$^2$, the coating will become too thin and the treatment for baking the coating will cause the tin to easily oxide and the coating adhesive strength to fall, so this is not preferred.

Further, the zirconium compound coating formed by treatment by cathodic electrolysis in a zirconium sulfate aqueous solution includes a small residual amount of sulfuric acid radicals ($SO_4^{2-}$). If the residual sulfuric acid radicals ($SO_4^{2-}$) are too great in amount, the above-mentioned wet T-peel strength after retort treatment will deteriorate.

Figure 4:
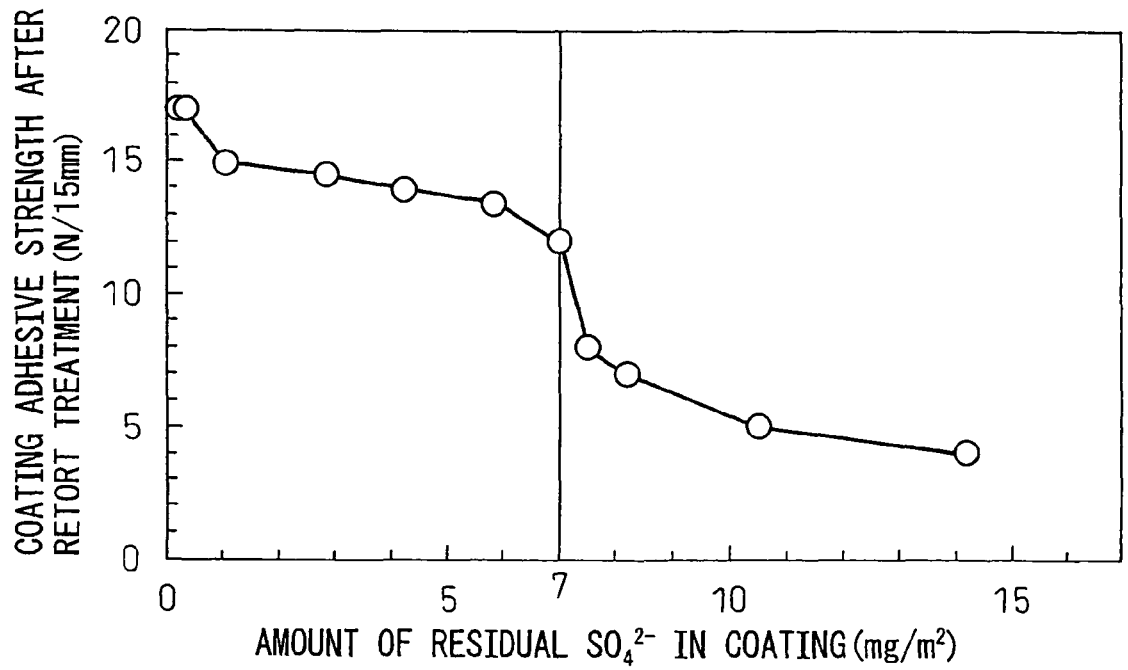
FIG. 4 is a graph showing the relationship between the amount of residual sulfuric acid radicals ($SO_4^{2-}$) in the zirconium compound coating and the coating adhesive strength after retort (wet T-peel strength).

The relationship between the amount of residual sulfuric acid radicals ($SO_4^{2-}$) in the zirconium compound coating (electrolysis conditions: 1 A/dm$^2$ (40° C.)×5 seconds, rinsing conditions: 30° C.×0.5 to 90 seconds) and the film adhesive strength after retort treatment (wet T-peel strength) is shown in FIG. 4.

That the absence of any sulfuric acid radicals ($SO_4^{2-}$) in the zirconium compound coating is desirable goes without saying. However, even if remaining, if the amount of sulfuric acid radicals ($SO_4^{2-}$) is 7 mg/m$^2$ or less, as will be understood from FIG. 4, there is little deterioration of the film adhesion of the laminated steel sheet after the retort treatment, so there is no problem.

Rinsing or washing by warm water after treatment by cathodic electrolysis in a zirconium sulfate aqueous solution enables reduction of the amount of sulfuric acid radicals ($SO_4^{2-}$) remaining in the zirconium compound coating, but even if strengthening the rinsing or washing by warm water, it is difficult to completely remove the sulfuric acid radicals ($SO_4^{2-}$) remaining in the zirconium compound coating, so the sheet need only be washed to a range whereby the load of rinsing and washing does not become too great.

The amount of residual sulfuric acid radical ($SO_4^{2-}$) in the case of washing by warm water is about 0.2 mg/m$^2$, so the amount of the sulfuric acid radicals ($SO_4^{2-}$) remaining in the zirconium compound coating is preferably controlled to the range of 0.2 mg/m$^2$ to 7 mg/m$^2$. The more preferable upper limit of the amount of sulfuric acid radicals is 6 mg/m$^2$, while the still more preferable upper limit is 5 mg/m$^2$.

It is believed that by further treating tin-plated steel sheet treated to remove the tin oxide layer by cathodic electrolysis in a zirconium sulfate aqueous solution, the pH at the interface on the tin plating will rise and zirconium will precipitate as an oxide on the tin plating. If the pH of the zirconium sulfate aqueous solution exceeds 2.5, the solubility of the zirconium compound will become poor and a large amount will end up precipitating as sludge in the cathodic electrolysis treatment, so this is not preferred.

Further, if the pH of the zirconium sulfate aqueous solution is less than 0.6, the zirconium compound will become harder to precipitate, so this is not preferred. To adjust the lower limit of the pH of the zirconium sulfate aqueous solution, an alkaline compound having K$^+$, Na$^+$, NH$_4^+$, Mg$^{2+}$, amines, or other cationic species may be added. Further, to adjust the upper limit of the pH of the zirconium sulfate aqueous solution, it is sufficient to add a suitable amount of sulfuric acid.

Next, the suitable ranges of concentration of the zirconium sulfate aqueous solution and amount of deposition of zirconium compound coating converted to zirconium (electrolysis conditions: 1 A/dm$^2$ (40° C.)×5 seconds) in the formation of a zirconium compound coating will be explained with reference to FIG. 5.

Figure 5:
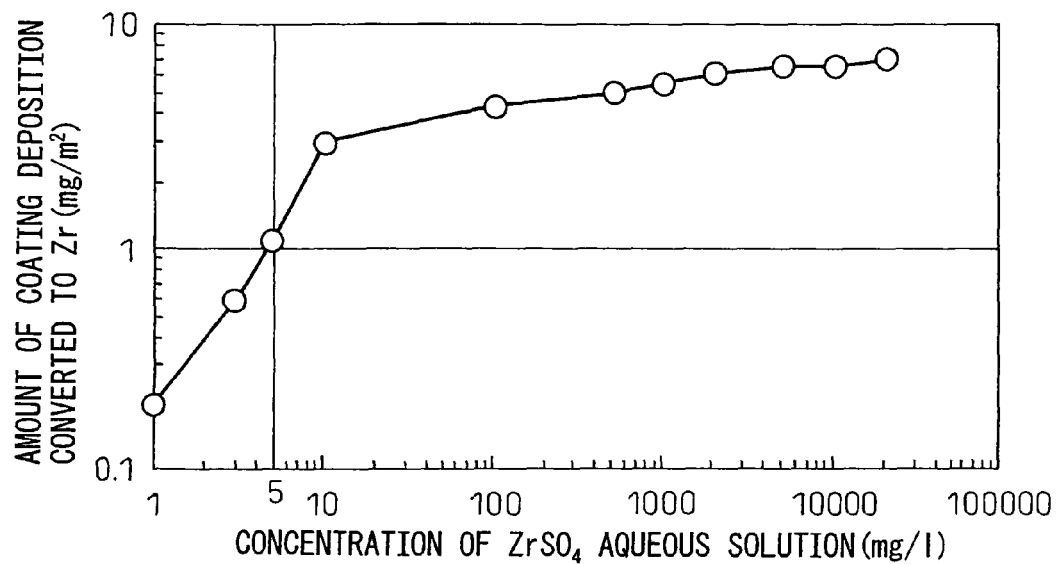
FIG. 5 is a graph showing the relationship between the concentration of a zirconium sulfate aqueous solution and the amount of deposition of the zirconium compound coating converted to zirconium.

As will be understood from FIG. 5, if the concentration of the zirconium sulfate aqueous solution is less than 5 mg/l, the zirconium compound will be hard to precipitate by the cathodic electrolysis treatment and an amount of coating of 1 mg/m$^2$ converted to zirconium will not be able to be secured, so this is not preferred.

Figure 6:
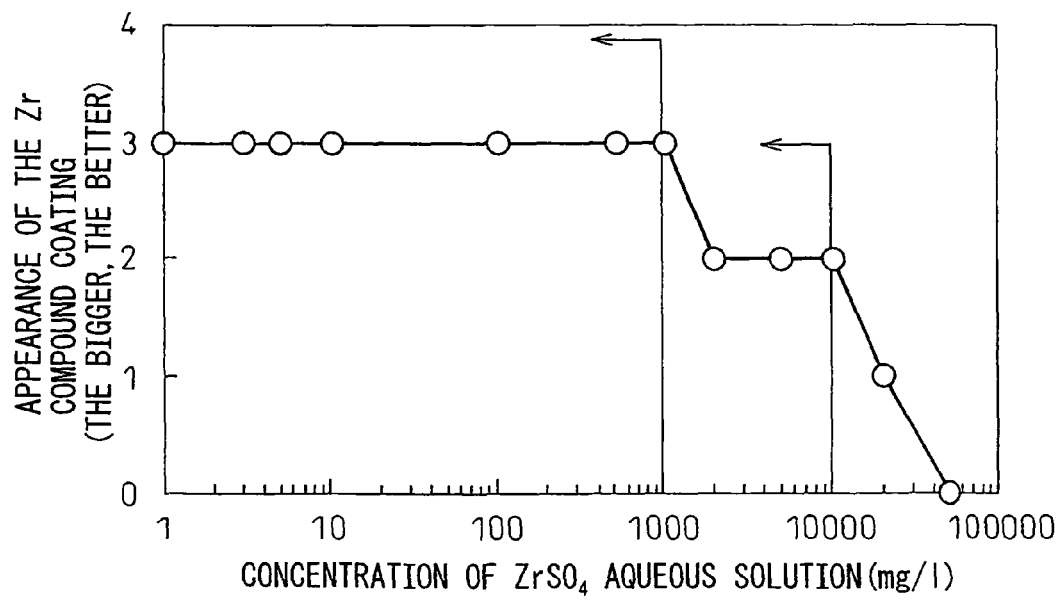
FIG. 6 is a graph showing the relationship between the concentration of the zirconium sulfate aqueous solution and the appearance (evenness) of the zirconium compound coating.

Further, the relationship between the concentration of the zirconium sulfate aqueous solution and the appearance (evenness) of the zirconium compound coating is shown in FIG. 6. Here, the relationship is shown by scoring the coating appearance as 0 (unevenness accompanying peeling of coating), 1 (spots of dark uneven gloss), 2 (good with some uneven gloss), and 3 (good with no uneven gloss).

As will be understood from FIG. 6, if the concentration of the zirconium sulfate aqueous solution exceeds 10 g/l, at the time of cathodic electrolysis, uneven precipitation of the zirconium compound will easily occur and it will become impossible to secure a good level of 2 or 3 of the coating appearance judgment criteria, so this is not preferred.

In addition, if the concentration of the zirconium sulfate aqueous solution is high, the apparent amount of consumption of zirconium will become greater due to the solution being taken out at the time of continuous processing. This is not economical, so is not preferred.

From these reasons, the concentration of the zirconium sulfate aqueous solution is preferably 5 mg/l to 10 g/l, more preferably from FIG. 5, the lower limit is made 10 mg/l or more where the amount of zirconium compound coating stabilizes, while from FIG. 6, the upper limit is made 1 g/l so that a good level of 3 of the coating appearance judgment criteria can be secured.

If the temperature of the zirconium sulfate aqueous solution is in the range of 10° C. to 70° C. or so, there is no problem in precipitation of the zirconium compound and work efficiency, but if in the range of 30° C. to 50° C., the zirconium compound will precipitate with a higher efficiency and there will be less fluctuation in concentration due to evaporation, so this is preferred.

Still further, when using the treatment tank and piping system etc. for treatment other than chrome-free priming as well, even if switching the treatment process to chrome-free priming, fluorine or nitrate nitrogen sometimes unavoidably will enter.

The fluorine or nitrate nitrogen in the chrome-free foundation layer is preferably 5 mg/m$^2$ or less. If the level of content is 5 mg/m$^2$ or less, this can be said not to be treatment substantially using fluorine or nitrate nitrogen. This treatment solution can also be treated by the waste liquor treatment facilities of conventional electrolytic chromic acid treatment, so the load on the waste liquor treatment system is far smaller than with electrolytic chromic acid treatment solutions and the cost of treatment of the waste liquor is of a negligible level.

After coating the treatment solution on the tin-plated steel sheet, the sheet is preferably dried to evaporate the moisture. The drying method may be natural drying or may be heated drying.

EXAMPLES

In the examples and comparative examples, the evaluation tests were conducted as follows:

1. Measurement of Thickness of Tin Oxide Layer

The thickness of the tin oxide layer shown in each of the examples and comparative examples below was measured by calculating the amount of electricity from the electric stripping time until the removal of the tin oxide layer at the time of constant current electric stripping in a 0.01% HBr aqueous solution at 1 mA using the tin-plated steel sheet as an anode and expressing it as the amount of electricity required for electric stripping per unit area (mC/cm$^2$).

2. Measurement of Primer Deposition Amount

The amount of primer deposition after priming was measured by measuring the amount of zirconium in the zirconium compound coating by fluorescent X-ray absorption spectrum measurement and expressing it by an amount per unit area (mg/m$^2$). Further, the amount of sulfuric acid radicals (SO$_4^{2-}$) remaining in the priming coating was measured by measuring the amount of sulfur in the film by fluorescent X-ray absorption spectrum measurement and expressed converted to the amount of SO$_4$ (mg/m$^2$).

3. Film Lamination

The front and back surfaces of each of the steel sheets prepared in the examples and comparative examples were heated to 7° C. lower than the melting point of tin, that is, 225° C., then the two surfaces were hot laminated with 20 μm thick undrawn copolymer polyester (terephthalic acid/isophthalic acid (weight ratio 88/12) and ethylene glycol copolymer polyester (melting point 228° C.)) film at a laminate roll temperature 150° C. by a processing speed of 150 m/min and immediately water cooled to obtain a film laminated steel sheet.

4. Retort Treatment

The film laminated steel sheet was placed in a steam cooker for retort treatment and retort sterilized at 125° C. for 90 minutes.

5. Measurement of Film Peel Strength

Figure 7:
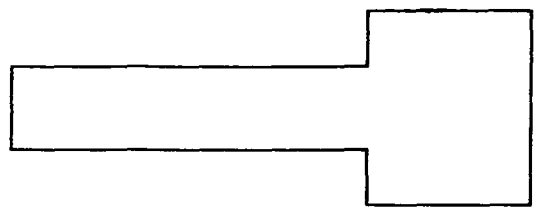
FIG. 7 is an explanatory view of a test piece for measurement of the film peel strength in the examples.
Figure 7:
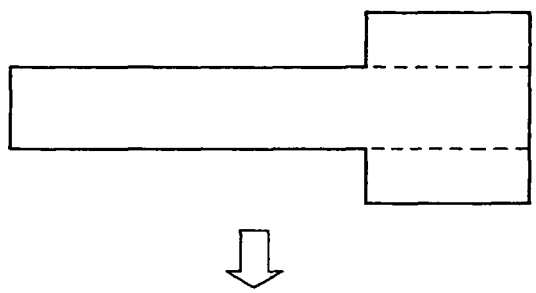
Figure 7:
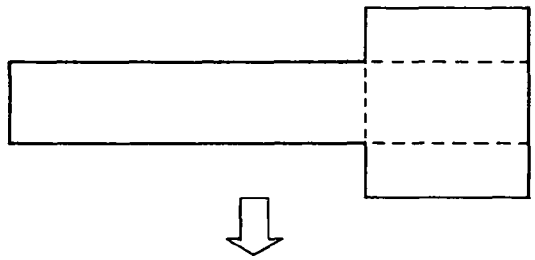
Figure 7:
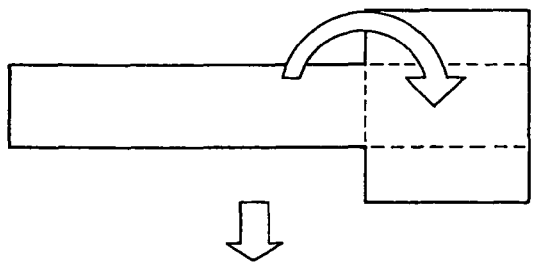
Figure 7:
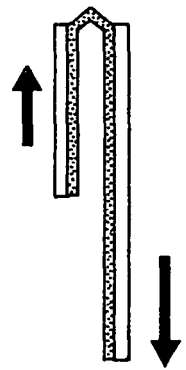

Each untreated and retort treated film laminated steel sheet was punched using a specialized punching die to a shape such as shown in FIG. 7 (FIG. 7(*a*)). The film surface at the part of the test piece enlarged in width was scored at a 15 mm width over lengths of 30 mm or more until reaching the steel sheet surfaces (FIG. 7(*b*)).

The part of the steel sheet where the test piece width increased from 15 mm to 30 mm was cut using a specialized die press in the width directions while leaving behind the film (FIG. 7(*c*)), then the part of the test piece width of 15 mm was folded back over the part of the test piece width of 30 mm so that the film was folded back 180° (FIG. 7(*d*)).

The part of the test piece with the 30 mm width was inserted into a jig attached to a tensile tester, the part of the test piece width of 15 mm was attached to the clamps of tensile tester, and the film was subjected to a 180° peeling test (FIG. 7(*e*)).

The 180° peel strength of the film was measured at room temperature at a tensile speed of 20 mm/min. Each retort treated test piece was measured for film peel strength in the wet state by conducting the peeling test while dropping water by a syringe on the part where the film and steel sheet peeled apart during the peeling test.

6. Canmaking

A film laminated steel sheet was coated on its two sides with a wax-based lubricant, then punched out by a press into a disk of a diameter of 155 mm to obtain a shallow drawn cup.

Next, this shallow drawn cup was stretch ironed to obtain a cup of a cup diameter of 52 mm, a cup height of 138 mm, and a rate of reduction in average sheet thickness can of the side walls of 18%.

This cup was heat treated at 215° C. for film stress relief, then was heat treated at 200° C. corresponding to printing and baking to prepare a sample for evaluation of the can properties.

7. Retort Treatment of Can Product

Some of the can products shown in the preceding section were placed in a steam cooker for retort treatment and retort sterilized at 125° C. for 90 minutes.

8. Measurement of Amount of Iron Dissolution

Each of the cans was filled with an alkali ion soft drink (for example, Coca Cola Japan's Aquarius) up to the top of the can, heat treated in a thermostat bath at 37° C. for 7 days, then taken out of the constant temperature tank and emptied of the Aquarius in the can.

Next, the can wall positions at the can height 25 mm position and 75 mm position and the steel sheet rolling direction (0° direction) and 90° direction of the can were subjected to a Dupont impact test under a 5° C. environment (weight of 1 kg, weight dropping height of 40 mm, diameter of tip of indenter of Φ16 mm) using respectively different cans.

The can after the Dupont impact was again filled with Aquarius, placed in a 50° C. thermostat bath for 7 days, then measured for the amount of iron dissolved into the Aquarius in the can by the atomic absorbance method.

The difference between the amount of iron in the Aquarius before being filled and the amount of iron in the Aquarius after the dissolution test was used as the amount of iron dissolution per can (mg/l).

The test was conducted for three cans for each Dupont impact position. The total average of the amounts of iron dissolution for the four Dupont impact position (12 cans) was used as the amount of iron dissolution per level.

9. Preparation of Pre-Coated Steel Sheets

Each steel sheet obtained by performing up to the priming step of the examples and comparative examples was coated on its surfaces using a bar coater by can-use epoxy coating (Sizing Needs PG-800-88 made by Dainippon Ink & Chemicals) to 25 g/m$^2$ on one side, then baked in a baking drying oven at 180° C. for 10 minutes.

10. Preparation of T-Peel Test Piece for Evaluation of Coating Adhesion

The coated surfaces of two pre-coated steel sheets were hot bonded by a hot press via an ethylene acryl acid (EAA) adhesive film (0.1 mm thick) (200° C., 60 seconds, 1 MPa).

After the hot bonding, the test piece was cooled and cut into bonded test pieces of a width of 10 mm and a length of 150 mm. About 50 mm of the lengths of the bonded test pieces were peeled off in advance as clamping margins for the tensile tests so as to prepare T-peel test pieces.

11. Evaluation of Coating Adhesion (T-Peel Test)

The clamping margins peeled in advance were clamped by the clamps of a tensile tester. The T-peel strength was measured for 100 mm of the bonded part at room temperature at a tensile speed of 20 mm/min so as to evaluate the coating adhesion.

Table 1 and Table 2 show the surface treatment conditions of steel sheets used for the examples, while Table 3 shows the same for the comparative examples. The test pieces after retort treatment were measured for the T-peel strength in the wet state by dropping water by a syringe on the part where the coating and steel sheet peel peeled apart in a peeling test.

TABLE 1

|   | Steel sheet thickness | Amount of deposition of tin (g/m$^2$) | Method of treatment for removal of tin oxide | Remaining amount of tin oxide |
|---|---|---|---|---|
| A | 0.24 mm | Front/back = 2.8/28 | Treatment by cathodic electrolysis in NaCO$_3$ (30 g/l) aqueous solution, then rinsing and drying. Electrolysis conditions: 5 A/dm$^2$ × 10 sec (40° C.) | 0.7 (mC/cm$^2$) |
| B | 0.24 mm | Front/back = 2.8/28 | Treatment by dipping in H$_2$SO$_4$ (2%) aqueous solution, then rinsing and drying. Dipping conditions: Solution temperature 30° C. × 30 sec | 1.5 (mC/cm$^2$) |
| C | 0.24 mm | Front/back = 2.8/28 | Treatment by dipping in H$_2$SO$_4$ (2%) aqueous solution, then rinsing and drying. Dipping conditions: Solution temperature 30° C. × 15 sec | 3.5 (mC/cm$^2$) |
| D | 0.24 mm | Front/back = 2.8/28 | Treatment by dipping in H$_2$SO$_4$ (2%) aqueous solution, then rinsing and drying. Dipping conditions: Solution temperature 30° C. × 5 sec | 3.8 (mC/cm$^2$) |
| E | 0.24 mm | Front/back = 2.8/28 | Untreated | 4.4 (mC/cm$^2$) |
| F | 0.24 mm | Front/back = 2.8/28 | Na$_2$Cr$_2$O$_7$ electrolytic treatment (metal chrome layer = 100 mg/m$^2$, chrome oxide layer = 10 mg/m$^2$) | |
| G | 0.24 mm | | Tin-free steel sheet (metal chrome layer = 100 mg/m$^2$, chrome oxide layer = 10 mg/m$^2$) | |

TABLE 2

|   | Steel sheet | Priming layer, treatment method | Amount of deposition of primer (mg/m$^2$) | Amount of sulfuric acid radicals (SO$_4^{2-}$) in primer layer (mg/m$^2$) | Amount of remaining fluorine in primer layer (mg/m$^2$) | Amount of remaining nitrate nitrogen in primer layer (mg/m$^2$) |
|---|---|---|---|---|---|---|
| Ex. 1, 9 | A | Treatment by cathodic electrolysis in H$_2$Zr(OH)$_2$(SO$_4$)$_2$ (0.5 g/l) aqueous solution, then rinsing (25° C. × 10 sec) and drying. Electrolysis conditions: 1A/dm$^2$ × 5 sec (40° C.) | Zr: 4.6 | 0.9 | 0 | 0 |
| Ex. 2, 10 | B | Treatment by cathodic electrolysis in H$_2$Zr(OH)$_2$(SO$_4$)$_2$ (0.5 g/l) aqueous solution, then rinsing (25° C. × 10 sec) and drying. Electrolysis conditions: 1A/dm$^2$ × 5 sec (40° C.) | Zr: 4.0 | 0.9 | 0 | 0 |

TABLE 2-continued

| | Steel sheet | Priming layer, treatment method | Amount of deposition of primer (mg/m$^2$) | Amount of sulfuric acid radicals (SO$_4^{2-}$) in primer layer (mg/m$^2$) | Amount of remaining fluorine in primer layer (mg/m$^2$) | Amount of remaining nitrate nitrogen in primer layer (mg/m$^2$) |
|---|---|---|---|---|---|---|
| Ex. 3, 11 | C | Treatment by cathodic electrolysis in H$_2$Zr(OH)$_2$(SO$_4$)$_2$ (0.5 g/l) aqueous solution, then rinsing (25° C. × 10 sec) and drying<br>Electrolysis conditions: 1A/dm$^2$ × 5 sec (40° C.) | Zr: 3.8 | 1.0 | 0 | 0 |
| Ex. 4, 12 | A | Treatment by cathodic electrolysis in H$_2$Zr(OH)$_2$(SO$_4$)$_2$ (0.5 g/l) aqueous solution, then rinsing (25° C. × 10 sec) and drying<br>Electrolysis conditions: 1A/dm$^2$ × 2 sec (40° C.) | Zr: 1.0 | 0.9 | 0.2 | 0 |
| Ex. 5, 13 | A | Treatment by cathodic electrolysis in H$_2$Zr(OH)$_2$(SO$_4$)$_2$ (0.5 g/l) aqueous solution, then rinsing (25° C. × 10 sec) and drying<br>Electrolysis conditions: 1A/dm$^2$ × 2 sec (40° C.) | Zr: 1.43 | 0.8 | 3.0 | 0 |
| Ex. 6, 14 | A | Treatment by cathodic electrolysis in H$_2$Zr(OH)$_2$(SO$_4$)$_2$ (0.5 g/l) aqueous solution, then rinsing (25° C. × 10 sec) and drying<br>Electrolysis conditions: 1A/dm$^2$ × 40 sec (40° C.) | Zr: 30 | 7.0 | 0 | 0 |
| Ex. 7, 15 | A | Treatment by cathodic electrolysis in H$_2$Zr(OH)$_2$(SO$_4$)$_2$ (0.5 g/l) aqueous solution, then rinsing (80° C. × 10 sec) and drying<br>Electrolysis conditions: 1A/dm$^2$ × 5 sec (40° C.) | Zr: 4.5 | 0.2 | 0 | 0 |
| Ex. 8, 16 | A | Treatment by cathodic electrolysis in H$_2$Zr(OH)$_2$(SO$_4$)$_2$ (0.5 g/l) aqueous solution, then rinsing (25° C. × 2 sec) and drying<br>Electrolysis conditions: 1A/dm$^2$ × 5 sec (40° C.) | Zr: 3.8 | 7.0 | 0 | 0 |

TABLE 3

| | Steel sheet | Priming layer, treatment method | Amount of deposition of primer (mg/m$^2$) | Amount of sulfuric acid radicals (SO$_4^{2-}$) in primer layer (mg/m$^2$) | Amount of remaining fluorine in primer layer (mg/m$^2$) | Amount of remaining nitrate nitrogen in primer layer (mg/m$^2$) |
|---|---|---|---|---|---|---|
| Comp. Ex. 1, 11 | D | Treatment by cathodic electrolysis in H$_2$Zr(OH)$_2$(SO$_4$)$_2$ (0.5 g/l) aqueous solution, then rinsing (25° C. × 10 sec) and drying<br>Electrolysis conditions: 1A/dm$^2$ × 5 sec (40° C.) | Zr: 4.2 | 0.9 | 0 | 0 |
| Comp. Ex. 2, 12 | E | Treatment by cathodic electrolysis in H$_2$Zr(OH)$_2$(SO$_4$)$_2$ (0.5 g/l) aqueous solution, then rinsing (25° C. × 10 sec) and drying<br>Electrolysis conditions: 1A/dm$^2$ × 5 sec (40° C.) | Zr: 3.8 | 0.9 | 0 | 0 |
| Comp. Ex. 3, 13 | A | Treatment by cathodic electrolysis in H$_2$Zr(OH)$_2$(SO$_4$)$_2$ (0.5 g/l) aqueous solution, then rinsing (25° C. × 10 sec) and drying<br>Electrolysis conditions: 1A/dm$^2$ × 60 sec (40° C.) | Zr: 32 | 1.0 | 0 | 0 |

TABLE 3-continued

| | Steel sheet | Priming layer, treatment method | Amount of deposition of primer (mg/m$^2$) | Amount of sulfuric acid radicals (SO$_4^{2-}$) in primer layer (mg/m$^2$) | Amount of remaining fluorine in primer layer (mg/m$^2$) | Amount of remaining nitrate nitrogen in primer layer (mg/m$^2$) |
|---|---|---|---|---|---|---|
| Comp. Ex. 4, 14 | A | Treatment by cathodic electrolysis in H$_2$Zr(OH)$_2$(SO$_4$)$_2$ (0.5 g/l) aqueous solution, then rinsing (25° C. × 1 sec) and drying Electrolysis conditions: 1A/dm$^2$ × 5 sec (40° C.) | Zr: 4.5 | 7.5 | 0 | 0 |
| Comp. Ex. 5, 15 | F | Treatment by Na$_2$Cr$_2$O$_7$ electrolysis (metal chrome layer = 10 mg/m$^2$, chrome oxide layer = 10 mg/m$^2$) | Cr: 20 | 0 | 0 | 0 |
| Comp. Ex. 6, 16 | G | Metal chrome layer = 10 mg/m$^2$, chrome oxide layer = 10 mg/m$^2$ | Cr: 110 | 0 | 0 | 0 |
| Comp. Ex. 7, 17 | A | Treatment by cathodic electrolysis in Na$_3$PO$_4$—12H$_2$0 (30 g/l) and H$_3$PO$_4$ (25 g/l), then rinsing (25° C. × 10 sec) and drying Electrolysis conditions: 1A/dm$^2$ × 5 sec (40° C.) | P: 1.2 | 0 | 0 | 0 |
| Comp. Ex. 8, 18 | A | Dipping in amino group- and epoxy group-containing silane coupling agent (1%) ethanol/aqueous solution, then rolling off excess solution and drying in 150° C. drying oven for 30 sec | Si: 10 | 0 | 0 | 0 |
| Comp. Ex. 9, 19 | A | Treatment by cathodic electrolysis in Ce(NO$_3$)$_3$ (30 g/l) Electrolysis conditions: 1A/dm$^2$ × 5 sec (40° C.) | Ce: 15 | 0 | 0 | 5.5 |
| Comp. Ex. 10, 20 | A | Treatment by cathodic electrolysis in H$_2$Zr(OH)$_2$(SO$_4$)$_2$ (0.5 g/l) aqueous solution, then rinsing (25° C. × 10 sec) and drying Electrolysis conditions: 1A/dm$^2$ × 1 sec (40° C.) | Zr: 0.9 | 0.4 | 0 | 0 |

Table 4 shows the initial adhesive strength and the adhesive strength after retort treatment of the films and the amounts of iron dissolution of the can products when using sheets treated under the conditions of Tables 1 to 3 to prepare film laminated steel sheets.

TABLE 4

| | Tin oxide layer thickness (mC/cm$^2$) | Amount of deposition of primer (converted to metal) (mg/m$^2$) | Amount of sulfuric acid radicals (SO$_4^{2-}$) in primer layer | Initial film adhesive strength (N/15 mm) | Post-retort film adhesive strength (wet state) T peel strength) (N/10 mm) | Amount of iron dissolution of can product (mg/l) |
|---|---|---|---|---|---|---|
| Ex. 1 | 0.7 | Zr: 4.6 | 0.9 | 17 | 17 | 1.405 |
| Ex. 2 | 1.5 | Zr: 4.0 | 0.9 | 16 | 16 | 1.435 |
| Ex. 3 | 3.5 | Zr: 3.8 | 1.0 | 13 | 15 | 1.505 |
| Ex. 4 | 0.7 | Zr: 1.0 | 0.9 | 16 | 16 | 1.425 |
| Ex. 5 | 0.7 | Zr: 1.5 | 0.8 | 15 | 14 | 1.477 |
| Ex. 6 | 0.7 | Zr: 30 | 5.0 | 13 | 13 | 1.520 |
| Ex. 7 | 0.7 | Zr: 4.5 | 0.2 | 18 | 17 | 1.410 |
| Ex. 8 | 0.7 | Zr: 3.8 | 7.0 | 14 | 12 | 1.553 |
| Comp. Ex. 1 | 3.8 | Zr: 4.2 | 0.9 | 14 | 8 | 1.603 |
| Comp. Ex. 2 | 4.4 | Zr: 3.8 | 0.9 | 10 | 5 | 1.725 |
| Comp. Ex. 3 | 0.7 | Zr: 32 | 1.0 | 8 | 7 | 2.350 |
| Comp. Ex. 4 | 0.7 | Zr: 4.5 | 7.5 | 15 | 8 | 1.650 |
| Comp. Ex. 5 | — | Cr: 20 | 0 | 19 | 18 | 1.426 |

TABLE 4-continued

|  | Tin oxide layer thickness (mC/cm$^2$) | Amount of deposition of primer (converted to metal) (mg/m$^2$) | Amount of sulfuric acid radicals (SO$_4^{2-}$) in primer layer | Initial film adhesive strength (N/15 mm) | Post-retort film adhesive strength (wet state) T peel strength) (N/10 mm) | Amount of iron dissolution of can product (mg/l) |
|---|---|---|---|---|---|---|
| Comp. Ex. 6 | — | Cr: 110 | 0 | 16 | 15 | 3.055 |
| Comp. Ex. 7 | 0.7 | P: 1.2 | 0 | 14 | 0 | 1.815 |
| Comp. Ex. 8 | 0.7 | Si: 10 | 0 | 11 | 7 | 1.789 |
| Comp. Ex. 9 | 0.7 | Ce: 15 | 0 | 17 | 14 | 1.057 |
| Comp. Ex. 10 | 0.7 | Zr: 0.9 | 0.4 | 12 | 9 | 1.790 |

Table 5 shows the initial adhesive strength and the adhesive strength in the wet state after retort treatment of T-peel test pieces obtained by using sheets treated under the conditions of Tables 1 to 3 to prepare pre-coated steel sheets and bonding the coated surfaces by ethylene acryl acid adhesive film.

TABLE 5

|  | Tin oxide layer thickness (mC/cm$^2$) | Amount of deposition of primer (converted to metal) (mg/m$^2$) | Amount of sulfuric acid radicals (SO$_4^{2-}$) in primer layer | Initial coating adhesion T peel strength (N/10 mm) | Post-retort coating adhesive strength (wet state) T peel strength) (N/10 mm) |
|---|---|---|---|---|---|
| Ex. 9 | 0.7 | Zr: 4.6 | 0.9 | 115 | 110 |
| Ex. 10 | 1.5 | Zr: 4.0 | 0.9 | 115 | 105 |
| Ex. 11 | 3.5 | Zr: 3.8 | 1.0 | 105 | 95 |
| Ex. 12 | 0.7 | Zr: 1.0 | 0.9 | 110 | 105 |
| Ex. 13 | 0.7 | Zr: 1.5 | 0.8 | 110 | 100 |
| Ex. 14 | 0.7 | Zr: 30 | 7.0 | 90 | 75 |
| Ex. 15 | 0.7 | Zr: 4.5 | 0.2 | 120 | 115 |
| Ex. 16 | 0.7 | Zr: 3.8 | 7.0 | 115 | 100 |
| Comp. Ex. 11 | 3.8 | Zr: 4.2 | 0.9 | 55 | 45 |
| Comp. Ex. 12 | 4.4 | Zr: 3.8 | 0.9 | 40 | 25 |
| Comp. Ex. 13 | 0.7 | Zr: 32 | 1.0 | 45 | 40 |
| Comp. Ex. 14 | 0.7 | Zr: 4.5 | 7.5 | 110 | 70 |
| Comp. Ex. 15 | — | Cr: 20 | 0 | 105 | 90 |
| Comp. Ex. 16 | — | Cr: 110 | 0 | 110 | 95 |
| Comp. Ex. 17 | 0.7 | P: 1.2 | 0 | 35 | 0 |
| Comp. Ex. 18 | 0.7 | Si: 10 | 0 | 85 | 50 |
| Comp. Ex. 19 | 0.7 | Ce: 15 | 0 | 70 | 50 |
| Comp. Ex. 20 | 0.7 | Zr: 0.9 | 0.4 | 95 | 60 |

Examples 1 and 9 are tin-plated steel sheets from the surface of which tin oxide is removed to a level of 0.7 mC/cm$^2$ by treatment by cathodic electrolysis in a NaHCO$_3$ aqueous solution and further treated by cathodic electrolysis in a H$_2$Zr(OH)$_2$(SO$_4$)$_2$ aqueous solution (0.5 g/l) to form a zirconium compound coating on the tin plating.

As shown in Table 4 and Table 5, it is learned that the sheets are superior in film adhesions as a film laminated steel sheet in the initial state and after retort treatment and the coating adhesion as a pre-coated steel sheet.

Further, the amount of dissolution of iron in the laminated steel sheet can product of Example 1 was smaller than that of the film laminated steel sheet using the current mainstream tin-free steel shown in Comparative Example 6 and therefore better.

Note that Examples 1 and 9 are examples of testing using new circulating cell tanks. It was confirmed that the primer coatings did not have any fluorine or nitrogen remaining.

Examples 2, 3, 10, and 11 are tin-plated steel sheets from the surface of which tin oxide was removed to a level of 1.5 to 3.5 mC/cm$^2$ by dipping in a H$_2$SO$_4$ aqueous solution and further treated by cathodic electrolysis in a H$_2$Zr(OH)$_2$(SO$_4$)$_2$ aqueous solution (0.5 g/l) to form a zirconium compound coating on the tin plating.

As shown in Table 4 and Table 5, it is learned that the sheets are superior in film adhesions as a film laminated steel sheet in the initial state and after retort treatment and the coating adhesion as a pre-coated steel sheet.

Further, the amounts of dissolution of iron in the laminated steel sheet can products of Examples 2 and 3 were smaller than that of the film laminated steel sheet using the current tin-free steel shown in Comparative Example 6 and therefore better.

Examples 4, 5, 12, and 13 are tin-plated steel sheets from the surface of which tin oxide was removed to a level of 0.7 mC/cm$^2$ by treatment by cathodic electrolysis in a NaHCO$_3$ aqueous solution and further treated by cathodic electrolysis in a H$_2$Zr(OH)$_2$(SO$_4$)$_2$ aqueous solution (0.5 g/l) to form a zirconium compound coating on the tin plating.

In the past, circulating cell tanks used for other treatment baths were used, so the primer coating was confirmed to have fluorine or nitrogen in fine amounts.

However, even if the primer coating contained fluorine or nitrogen in fine amounts, as shown in Table 4 and Table 5, no effect on the film adhesions as a film laminated steel sheet in the initial state and after retort treatment and the coating adhesion as a pre-coated steel sheet could be seen.

Examples 6 and 14 are tin-plated steel sheets from the surfaces of which the tin oxide is removed to the level of 0.7 mC/cm$^2$ by treatment by cathodic electrolysis in a NaHCO$_3$ aqueous solution and further treated by cathodic electrolysis in a H$_2$Zr(OH)$_2$(SO$_4$)$_2$ aqueous solution (0.5 g/l) for 40 seconds to form a zirconium compound coating on the tin plating to 30 mg/m$^2$.

As shown in Table 4 and Table 5, no great drop in the film adhesions as a film laminated steel sheet in the initial state and after retort treatment and the coating adhesion as a pre-coated steel sheet could be seen.

Examples 7 and 15 are tin-plated steel sheets from the surfaces of which the tin oxide is removed to the level of 0.7 mC/cm$^2$ by treatment by cathodic electrolysis in a NaHCO$_3$ aqueous solution and further treated by cathodic electrolysis in a H$_2$Zr(OH)$_2$(SO$_4$)$_2$ aqueous solution (0.5 g/l) to form a zirconium compound coating on the tin plating, then washed by dipping in 80° C. warm water for 10 seconds.

The sulfuric acid radicals (SO$_4^{2-}$) in the zirconium compound coating were 0.2 mg/m$^2$. As shown in Table 4 and Table 5, the film adhesion as a film laminated steel sheet in the initial state and after retort treatment and the coating adhesion as a pre-coated steel sheet were good.

Examples 8 and 16 are tin-plated steel sheets from the surfaces of which tin oxide is removed to the level of 0.7 mC/cm$^2$ by treatment by cathodic electrolysis in a NaHCO$_3$ aqueous solutions and further treated by cathodic electrolysis in a H$_2$Zr(OH)$_2$(SO$_4$)$_2$ aqueous solution (0.5 g/l) to form a zirconium compound coating on the tin plating, and rinsed for 2 seconds.

The sulfuric acid radicals (SO$_4^{2-}$) in the zirconium compound coating were 5 mg/m$^2$, but as shown in Table 4 and Table 5, the film adhesion as a film laminated steel sheet in the initial state and after retort treatment and the coating adhesion as a pre-coated steel sheet were good.

Comparative Examples 1 and 11 are tin-plated steel sheets from the surfaces of which the tin oxide is removed to the level of 3.8 mC/cm$^2$ by treatment by cathodic electrolysis in a H$_2$SO$_4$ aqueous solution and further treated by cathodic electrolysis in a H$_2$Zr(OH)$_2$(SO$_4$)$_2$ aqueous solution (0.5 g/l) to form a zirconium compound coating on the tin plating.

If the tin oxide layer remains in more than 3.5 mC/cm$^2$, as shown in Table 4 and Table 5, it is learned that the film adhesion as a film laminated steel sheet after retort treatment and the coating adhesion as a pre-coated steel sheet become poor.

Comparative Examples 2 and 12 are untreated tin-plated steel sheets (tin oxide layer 4.4 mC/cm$^2$) treated by cathodic electrolysis in a H$_2$Zr(OH)$_2$(SO$_4$)$_2$ aqueous solution (0.5 g/l) to form a zirconium compound coating on the tin plating.

In the same way as Comparative Examples 1 and 11, if the tin oxide layer remains in a larger amount than 3.5 mC/cm$^2$, as shown in Table 4 and Table 5, it is learned that the film adhesion as a film laminated steel sheet after retort treatment and the coating adhesion as a pre-coated steel sheet become poor.

Comparative Examples 3 and 13 are tin-plated steel sheets from the surface of which tin oxide is removed to a level of 0.7 mC/cm$^2$ by treatment by cathodic electrolysis in a NaHCO$_3$ aqueous solution and further treated by cathodic electrolysis in a H$_2$Zr(OH)$_2$(SO$_4$)$_2$ aqueous solution (0.5 g/l) for 60 seconds to form 32 mg/m$^2$ of a zirconium compound coating on the tin plating.

As shown in Table 4 and Table 5, it is learned that the film adhesion as a film laminated steel sheet after retort treatment and the coating adhesion as a pre-coated steel sheet become poor.

Comparative Examples 4 and 14 are tin-plated steel sheets from the surface of which tin oxide is removed to a level of 0.7 mC/cm$^2$ by treatment by cathodic electrolysis in a NaHCO$_3$ aqueous solution and further treated by cathodic electrolysis in a H$_2$Zr(OH)$_2$(SO$_4$)$_2$ aqueous solution (0.5 g/l) to form a zirconium compound coating on the tin plating.

The rinsing time is short, so this is an example where the zirconium compound coating has 7.5 mg/m$^2$ of sulfuric acid radicals (SO$_4^{2-}$) remaining in it. As shown in Table 4 and Table 5, it is learned that if the zirconium compound coating has more than 7 mg/m$^2$ of sulfuric acid radicals (SO$_4^{2-}$) remaining in it, the film adhesion as a film laminated steel sheet after retort treatment and the coating adhesion as a pre-coated steel sheet become poor.

Comparative Examples 5 and 15 are examples of tin-plated steel sheets given the current chromate treatment. As shown in Table 4 and Table 5, it is learned that the film adhesions as a film laminated steel sheet in the initial state and after retort treatment are superior. However, the priming is a chromate film, so these are not chromate-free steel sheets.

Comparative Examples 6 and 16 are examples of current tin-free steel sheet. As shown in Table 4 and Table 5, they are superior in film adhesions as a film laminated steel sheet in the initial state and after retort treatment, but they are not chromate-free steel sheets.

Further, it is learned that the amount of iron dissolution of the can product is greater than one using tin-plated steel sheet. In addition, in tin-free steel sheet, the treatment solution contains fluoride, so the waste liquor has to be treated to render the fluoride harmless, but the fluoride remaining in the chromate film is 5 mg/m$^2$ or less. This is a level not affecting the film adhesion after retort treatment.

Comparative Examples 7 and 17 are tin-plated steel sheet from the surfaces of which tin oxide to removed to a level of 0.7 mC/cm$^2$ by treatment by cathodic electrolysis in a NaHCO$_3$ aqueous solution and further treated by cathodic electrolysis in a phosphate aqueous solution to form a phosphorus compound coating.

As shown in Table 4 and Table 5, it is learned that with phosphorus compound coating treatment, the film adhesion as a film laminated steel sheet after retort treatment and the coating adhesion as a pre-coated steel sheet become poor.

Comparative Examples 8 and 18 is tin-plated steel sheet from the surface of which the tin oxide is removed to the level of 0.7 mC/cm$^2$ by treatment by cathodic electrolysis in a NaHCO$_3$ aqueous solution and further treated by silane coupling to form a coating of a silane coupling agent.

As shown in Table 4 and Table 5, with silane coupling treatment, it is learned that the film adhesions as a film laminated steel sheet in the initial state and after retort treatment and the coating adhesion as a pre-coated steel sheet are not that good.

Comparative Examples 9 and 19 are tin-plated steel sheet from the surface of which the tin oxide is removed to the level of 0.7 mC/cm$^2$ by treatment by cathodic electrolysis in a NaHCO$_3$ aqueous solution and further treated by cathodic electrolysis in Ce(NO$_3$)$_3$ (30 g/l) to form a cerium compound coating on the tin plating.

As shown in Table 4 and Table 5, the film adhesions as a film laminated steel sheet in the initial state and after retort treatment are good, but chromate-free treatment chemicals include nitric acid. The nitrate nitrogen waste liquor has to be treated, so this is not desirable as a chromate-free treatment chemical.

Comparative Examples 10 and 20 are tin-plated steel sheet from the surfaces of which the tin oxide is removed to the level of 0.7 mC/cm$^2$ by treatment by cathodic electrolysis in a NaCO$_3$ aqueous solution and further treated by cathodic electrolysis in a H$_2$Zr(OH)$_2$(SO$_9$)$_2$ aqueous solution (0.5 g/l) to form a zirconium compound coating on the tin plating.

As shown in Table 4 and Table 5, it is learned that the film adhesions as a film laminated steel sheet after retort treatment and the coating adhesion as a pre-coated steel sheet become poor.

INDUSTRIAL APPLICABILITY

The steel sheet for a container material of a small environmental load of the present invention is equivalent to steel sheet for a container material given conventional chromate treatment in adhesion with a laminate film, coating, or other organic resin coating and resistance to iron dissolution after denting and is made by a treatment solution not including any chrome compound or fluoride and nitrate nitrogen.

For this reason, there is no need for the treatment to render these high environmental load substances harmless when discharging them. From the viewpoint of the environment, this is a steel sheet for a container material of a chrome-free type with a small environment load. It is superior in food safety and industrial productivity, so is extremely high in industrial value.

The invention claimed is:

1. A steel sheet for a can or a container comprising:
    a tin layer or iron-tin alloy layer on the steel sheet, wherein the tin layer or iron-tin alloy layer comprises Sn in an amount in the range of 2.8 g/m$^2$ to 12 g/m$^2$;
    an optional tin oxide layer of a thickness measured by an electric stripping method of 0 mC/cm$^2$ to 3.5 mC/cm$^2$ on the tin layer or iron-tin alloy layer; and
    a chrome-free foundation layer on the tin oxide layer if present or on the tin layer or iron-tin alloy layer if the tin oxide layer is not present including zirconium oxide, zirconium hydroxide, or a composite thereof in an amount converted to zirconium in the range of 1 mg/m$^2$ to 30 mg/m$^2$, wherein the chrome-free foundation layer optionally includes an amount of sulfate radical ($SO_4^{2-}$) in the range of 0 mg/m$^2$ to 7 mg/m$^2$.

2. The steel sheet for a can or a container as set forth in claim 1, wherein said chrome-free foundation layer does not contain either fluorine or nitrate nitrogen.

3. The steel sheet for a can or a container as set forth in claim 1, wherein the steel sheet further comprises a laminated film on the chrome-free foundation layer.

4. The steel sheet for a can or a container as set forth in claim 1, wherein the steel sheet comprises a tin oxide layer.

5. The steel sheet for a can or a container as set forth in claim 4, wherein the tin oxide layer has a thickness measured by an electric stripping method from 0.01 to 3.5 mC/cm$^2$.

6. The steel sheet for a can or a container as set forth in claim 4, wherein said chrome-free foundation layer does not contain either fluorine or nitrate nitrogen.

7. The steel sheet for a can or a container as set forth in claim 4, wherein the steel sheet further comprises a laminated film on the chrome-free foundation layer.

* * * * *

UNITED STATES PATENT AND TRADEMARK OFFICE
CERTIFICATE OF CORRECTION

PATENT NO.       : 8,404,357 B2
APPLICATION NO. : 12/733272
DATED            : March 26, 2013
INVENTOR(S)      : Kadowaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 69 days.

Signed and Sealed this
First Day of September, 2015

Michelle K. Lee
*Director of the United States Patent and Trademark Office*